United States Patent
Cederbaum

[15] 3,666,042
[45] May 30, 1972

[54] METHOD FOR ELIMINATING NOISE FROM A MOTOR POWER UNIT AND DEVICE FOR THE PURPOSE

[72] Inventor: Jerzy Henryk Cederbaum, Sorterargaton 14-16, Vallingby, Sweden

[22] Filed: May 7, 1971

[21] Appl. No.: 141,281

[30] Foreign Application Priority Data

Feb. 22, 1971  Sweden..........................................1295

[52] U.S. Cl...............................................181/33 K, 181/62
[51] Int. Cl.........................................F04b 39/12, F01n 1/00
[58] Field of Search..............181/33 R, 33 K, 33 GA, 33 GB, 181/33 G, 61, 62

[56] References Cited

UNITED STATES PATENTS

| 3,147,814 | 9/1964 | Suhre | 181/33 K |
| 3,462,949 | 8/1969 | Anderson et al. | 181/33 K |
| 3,478,958 | 11/1969 | Hinck et al. | 181/33 K |

FOREIGN PATENTS OR APPLICATIONS

| 761,751 | 6/1967 | Canada | 181/33 K |
| 357,147 | 9/1931 | Great Britain | 181/33 K |
| 1,208,482 | 9/1959 | France | 181/33 K |

Primary Examiner—Robert S. Ward, Jr.
Attorney—Ernest A. Greenside

[57] ABSTRACT

Noise eliminating device for a motor power unit having a chassis with a rectangular frame and a casing with an end wall at one end of the frame, a ceiling over the motor power unit compartment and a cooler grill at the other end of the frame and, a bit outside the sides of the frame, side walls of height roughly corresponding to half the height of the unit and with movable side walls intended to enclose the unit laterally by connection to the upper edge of the fixed side walls as also to the corresponding edge of the ceiling, and finally end wall sections connecting to the cooler grill and to the opposing end wall of the casing and enclosing side compartment on both sides of the unit, which also has an exhaust pipe passing up through the ceiling, the device comprising a plate under the chassis frame, two detachable side walls separating the side compartments from the power unit compartment over a major part of the unit, perforated plates in the end wall sections connected to the cooler grill, allowing the entry of air to the side compartments, an impeller which forces the cooling air out through the cooler grill, a cover which is L-shaped viewed from the side, providing an outer screen for the cooler grill, and inside the upper part of the cover a silencer for the exhaust pipe.

2 Claims, 1 Drawing Figure

Patented May 30, 1972
3,666,042
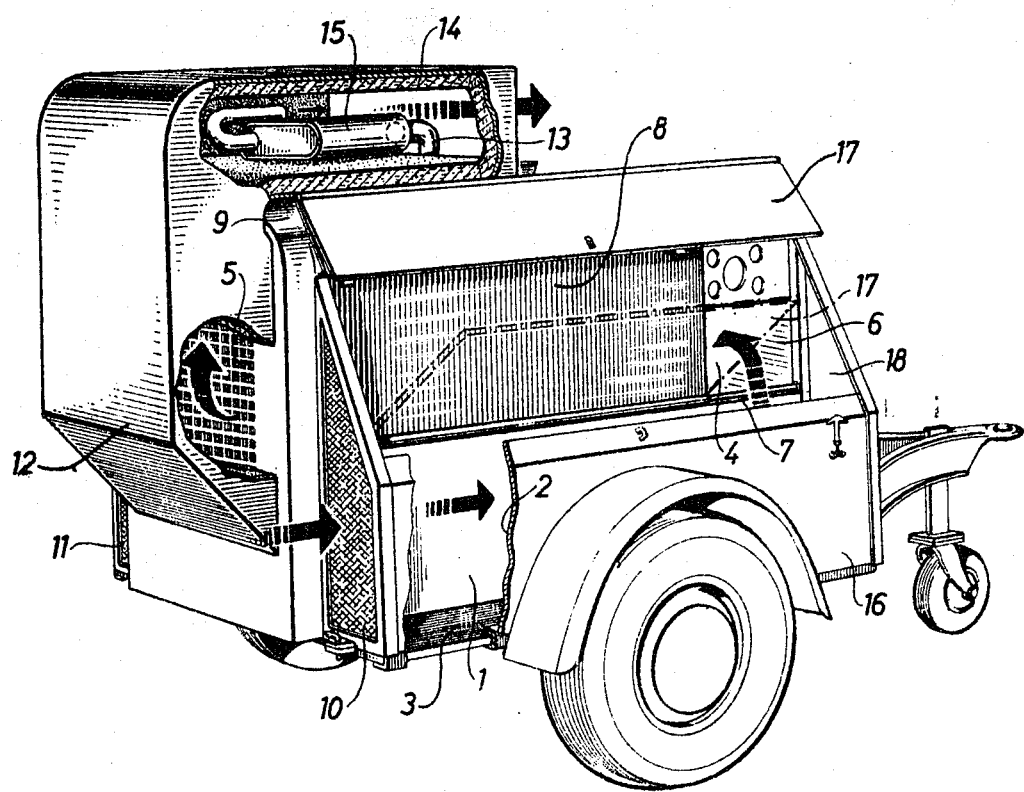

3,666,042

METHOD FOR ELIMINATING NOISE FROM A MOTOR POWER UNIT AND DEVICE FOR THE PURPOSE

The invention relates to a method of eliminating noise and at the same time, by means of an air current, cooling a motor power unit, for example a compressor. Specially constructed, silenced motor power units are known in which a very high noise-eliminating effect can be attained. But it is often desirable to be able to eliminate noise and at the same time, by means of an air current, cool a motor power unit of existing design without for that reason needing to arrange for a radical reconstruction of the unit.

The present invention relates to such a method for a motor power unit mounted on a chassis with a case-shaped rectangular frame and having a casing with a cooler grill at one end of the frame and, at the other end, an end wall, as also a ceiling terminating the motor power unit compartment at the top and, a bit outside the sides of the frame, fixed side walls of height roughly corresponding to half the height of the unit and with movable side walls intended to enclose the unit laterally by connection to the upper edges of the fixed side walls, as also the corresponding edge of the ceiling, and finally end wall sections connecting to the opposing end wall of the casing and terminating side compartments on both sides of the unit, the unit having an exhaust pipe passing up through the ceiling. The invention is characterized essentially in that the chassis frame and the side compartments are closed at the bottom by a bottom plate, that between the actual unit compartment and the side compartments there are detachable side walls extending essentially from the cooler grill up to the second end wall past the greater part of the side edges of the frame, the side walls sealing tightly against the cooler, one edge of the ceiling section and one side frame edge, but not reaching up to the end wall, that the end wall sections which are connected to the cooler grill are perforated, so allowing air to be drawn in to the side compartments and so that closed air flow channels, U-shaped viewed from above, are formed on each side of the unit, that the impeller is caused to force air out through the cooler grill by, for example, replacement of the impeller, and that a cover, essentially L-shaped viewed from the side, is placed over the cooler grill and the exhaust gas outlet of the unit, and that inside the cover, which should preferentially be coated with sound-absorbing material, there is a silencer for the exhaust pipe.

The invention relates also to a device for execution of the method with reference to a motor power unit of aforementioned kind and is characterized essentially in that the device comprises a plate on the underside of the chassis frame, two detachable side walls separating the side compartments of the unit from the power unit compartment over a major part of the length of the unit, perforated plates in the end wall sections connected to the cooler grill, allowing the entry of air to the side compartments, an impeller which forces the cooling air out through the cooler grill, a cover providing an outer screen for the cooler grill, which is L-shaped viewed from the side, and inside the upper part of the cover a silencer for the exhaust pipe of the unit.

The invention will now be described with reference to the attached drawing, which shows a motor compressor of known type to which the method according to the invention is applied.

The compressor shown in the drawing is mounted on a chassis with case-shaped, rectangular frame 1. The compressor has a casing with a cooler grill 5 at one end of the frame 1 and, a bit outside the sides 1 of the frame, fixed side walls 16, the height of which roughly corresponds to half the height of the unit. Inside the cooler grill a cooler is arranged in the known manner, and between it and the motor unit is a fan. The unit is imagined to drive a compressor. The casing also has movable side walls 17 intended to enclose the unit laterally by connection to the upper edge of the fixed side walls and to the corresponding ceiling edge. In the drawing these movable side walls 17 are shown in their upper, open position, in which the two halves of the side walls 17 are folded down. An intermediate position of the side wall 17 is shown by dotted lines. When this side wall is open, the unit is fully accessible for inspection. The unit casing has on the two sides of the end wall sections 18 of the unit two side compartments 2 connecting to the cooler grill 5 and to the opposing end wall 6, and finally the unit has also an exhaust pipe 13 passing up through the top.

According to the invention the chassis frame 1 and side compartments 2 are closed at the bottom by means of a bottom plate 3. Between the actual unit compartment 4 and the side compartments 2 there are also detachable side walls 8 extending essentially from the cooler grill 5 towards the second end wall 6 past the greater part of the side edges 7 of the frame. These side walls seal tightly against the cooler, an edge of the top section 9 and a side edge 7, but do not reach the end wall 6. In this way, on the two sides of the unit channels 2 are formed, U-shaped viewed from above, through which air can flow. For this purpose the end wall sections 10 and 11, which are connected to the cooler grill 5, are perforated, so allowing the entry of air to the side compartments 2. By replacing the impeller or causing it to rotate in the opposite direction, air can be drawn in through the U-shaped channel 2 and forced out through the cooler grill 5 instead of, as normally, drawing in air through the said grill 5. Since there has now been arranged an essentially L-shaped cover 12, viewed from the side, which extends out above the top of the unit and over the exhaust outlet 13, the hot air can be led upwards and discharged above the top of the unit. This also has the advantage of damping the noise of the exhaust outlet 13, which is also furnished with a silencer 15 inside the cover 12, which should preferably be coated internally with sound-absorbing material 14.

Although the invention has been described with reference to one of its embodiments, it can be arbitrarily varied within the scope of the following claims.

What I claim is:

1. A method of eliminating noise and at the same time, by means of an air current, cooling a motor power unit, for example a compressor, mounted on a chassis with a case-shaped rectangular frame and having a casing with a cooler grill at one end of the frame and, at the other end, an end wall as also a ceiling terminating the motor power unit compartment at the top and, a bit outside the sides of the frame, fixed side walls of height roughly corresponding to half the height of the unit and with movable side walls intended to enclose the unit laterally by connection to the upper edge of the fixed side walls as also to the corresponding edge of the ceiling, and finally end wall sections connecting to the cooler grill and to the opposing end wall of the casing and enclosing side compartments on both sides of the unit, the unit having an exhaust pipe passing up through the ceiling, characterized in that the chassis frame and the side compartments are closed at the bottom by a bottom plate, that between the actual unit compartment and the side compartments there are detachable side walls extending essentially from the cooler grill up to the second end wall past the greater part of the side edges of the frame, the side walls sealing tightly against the cooler, one edge of the ceiling section and one side frame edge, but not reaching up to the end wall, that the end wall sections which are connected to the cooler grill are perforated, so allowing air to be drawn into the side compartments and so that closed air flow channels, U-shaped viewed from above, are formed on each side of the unit, that the impeller is caused to force air out through the cooler grill by, for example, replacement of the impeller, and that a cover essentially L-shaped, viewed from the side, is placed over the cooler grill and the exhaust gas outlet of the unit, and that inside the cover, which should preferentially be coated with sound-absorbing material, there is a silencer for the exhaust pipe.

2. A device for execution of the method according to claim 1, with reference to a motor power unit mounted on a chassis with a case-shaped rectangular frame and having a casing with an end wall at one end of the frame, as also a ceiling over the motor power unit compartment and a cooler grill at the other end of the frame and, a bit outside the sides of the frame, side walls of height roughly corresponding to half the height of the unit and with movable side walls intended to enclose the unit laterally by connection to the upper edge of the fixed side walls as also to the corresponding edge of the ceiling, and finally end wall sections connecting to the cooler grill and to the opposing end wall of the casing and enclosing side compartments on both sides of the unit, the unit having an exhaust pipe passing up through the ceiling, characterized in that it comprises a plate on the underside of the chassis frame, two detachable side walls separating the side compartments of the unit from the power unit compartment over a major part of the length of the unit, perforated plates in the end wall sections connected to the cooler grill, allowing the entry of air to the side compartments, an impeller which forces the cooling air out through the cooler grill, a cover which is L-shaped viewed from the side, providing an outer screen for the cooler grill, and inside the upper part of the cover a silencer for the exhaust pipe of the unit.

* * * * *